United States Patent [19]
Tusim et al.

[11] Patent Number: 5,071,606
[45] Date of Patent: Dec. 10, 1991

[54] PLASTICIZERS FOR EXPANDABLE STYRENE-ACRYLONITRILE RESIN

[75] Inventors: Martin H. Tusim, Newark; Timothy W. Rhoads, Granville, both of Ohio

[73] Assignee: The Dow Chemical Company, Midland, Mich.

[21] Appl. No.: 582,043

[22] Filed: Sep. 13, 1990

[51] Int. Cl.⁵ ............................................. C08J 9/14
[52] U.S. Cl. ...................................... 264/53; 264/55; 521/79; 521/81; 521/88; 521/147
[58] Field of Search ................. 264/55, 53; 521/79, 521/81, 88, 147

[56] References Cited

U.S. PATENT DOCUMENTS

| | | | |
|---|---|---|---|
| 3,742,103 | 6/1973 | Spicuzza, Jr. | 521/146 |
| 3,827,990 | 8/1974 | Wright | 521/60 |
| 3,966,381 | 6/1976 | Suh | 264/45.5 |
| 4,256,850 | 3/1981 | Thorsread | 521/140 |
| 4,278,627 | 7/1981 | Kajimura et al. | 264/45.4 |
| 4,312,957 | 1/1982 | Spicuzza, Jr. | 521/60 |
| 4,438,224 | 3/1984 | Suh et al. | 521/146 |
| 4,442,232 | 4/1984 | Kajimura et al. | 521/147 |
| 4,456,706 | 6/1984 | Siedenstrang et al. | 521/140 |
| 4,559,367 | 12/1985 | Hurps et al. | 521/79 |
| 4,661,302 | 4/1987 | Park | 521/139 |
| 4,663,360 | 5/1987 | Park et al. | 521/86 |
| 4,681,715 | 7/1987 | Park et al. | 521/81 |

Primary Examiner—Morton Foelak

[57] ABSTRACT

Novel, expandable polymeric blends comprising at least one vinylaromatic monomer-acylonitrile resinous material, an effective amount of at least one blowing agent, and from about 0.2 to about 1.0 percent by weight, based on the weight of resinous material, of an expansion aid consisting essentially of triethylene glycol. The triethylene glycol expansion aid unexpectedly reduces the amount of expansion agent required to expand the composition, particularly to low density products, without adversely affecting the final properties of the foamed product.

8 Claims, 1 Drawing Sheet

PLASTICIZERS FOR EXPANDABLE STYRENE-ACRYLONITRILE RESIN

The present invention relates to expandable, that is, foamable, polymers, especially vinylaromaticacrylonitrile polymers. Expandable polymers are formed by compounding polymers, such as thermoplastic vinylaromatic polymers and copolymers, with a blowing agent.

Expandable thermoplastic resin compositions containing a suitable blowing agent are well known. When exposed to heat, the resin expands as the blowing agent expands. The expandable compositions are available in various forms, including a variety of particle sizes and shapes known generally as expandable beads. Among the most common expandable polymer bead currently available commercially are beads formed by blending a vinylaromatic polymer, such as a styrene-based polymer, with a blowing agent. Such expandable beads are widely used in manufacturing products such as hot- and cold-drink cups, toys, novelties, displays, ceiling tiles, ice chests, insulation board and block for construction, flotation devices, refrigerator components and packaging, including loose fill packing materials.

In forming loose fill packing materials, expansion of the foamable compositions to very low densities is desirable. For example, the unexpanded virgin beads which typically have a density of 35 to 75 pounds per cubic feet are expanded in a rotating steam chamber to a final density in the range from about 0.1 to 2.0 pounds per cubic feet, undergoing a volumetric expansion of 120 to 200 times the original volume of the virgin unexpanded beads. Typically, the beads are expanded through four passes or cycles through the steam chamber, with the incrementally-expanded beads being allowed to cool between passes to permit evaporation of surface moisture and allow the partial internal vacuum in the beads to equalize. For loose fill packing, the beads thus expanded are typically stored for twenty-four hours and then reprocessed through the rotating steam chamber and twenty-four hour storage cycle for three more passes.

The most common blowing agent used in the expansion of polymeric materials are the halogenated hydrocarbons known as CFCs, i.e. chlorofluorocarbons. Some CFCs are perceived to be environmental pollutants. Accordingly, there is a need for reducing the quantity of such halogenated hydrocarbons used in expanding polymeric materials if possible.

Further, it would be desirable to achieve maximum expansion of the expandable styrene-acrylonitrile beads more quickly. It would be desirable to expand the material to two pound density or less in two or three passes through the rotating steam chamber and twenty-four hour storage cycle rather than four without adversely affecting the final properties or structure of the foam.

SUMMARY OF THE INVENTION

The present invention is based on the surprising discovery that the incorporation of a small amount of triethylene glycol in expandable styrene-acrylonitrile beads provides equivalent or better expansion more economically, rapidly and with less blowing agent than would otherwise normally be used without adversely affecting the final properties or structure of the foam.

DESCRIPTION OF THE PREFERRED EMBODIMENT

Figure 1:
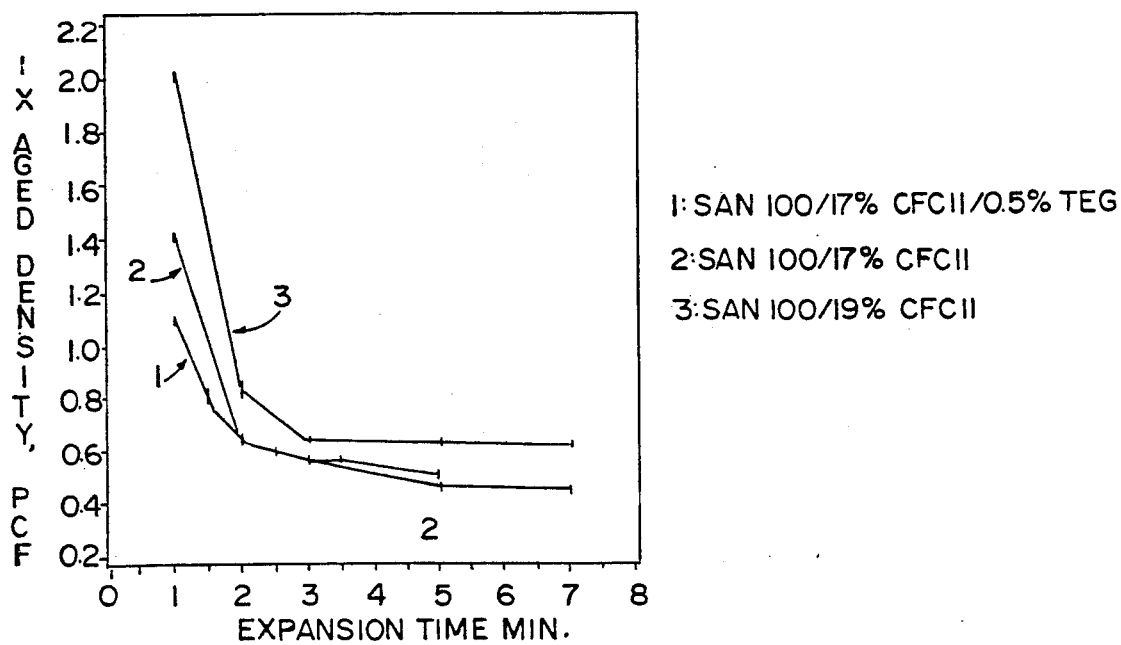
FIG. 1 is a graph comparing the effect of the triethylene glycol incorporation on the steam expansion of expandable styrene-acrylonitrile copolymer beads after a single pass through the steam chamber.

In the preferred embodiment of the invention, expansion characteristics of expandable vinylaromatic-acrylonitrile copolymer beads, especially styrene-acrylonitrile copolymer (SAN) beads, are not diminished when employing a lesser than normal amount of blowing agent, providing that the expandable copolymer beads contain from about 0.2 to about 1.0 percent by weight of triethylene glycol, in addition to the reduced amount of blowing agent. The incorporation of triethylene glycol into the expandable copolymer compositions does not negatively affect the final properties or structure of foam products produced from the copolymer compositions of this invention.

The expandable vinylaromatic-acrylonitrile copolymer beads which are employed in the practice of the invention are prepared from a monomer mixture containing at least 50 weight percent of at least one vinylaromatic monomer and from 15 to 50, preferably 20 to 40, and most preferably from 22 to 33 weight percent of acrylonitrile. The expandable copolymer beads will have incorporated therein from 1 to 25 weight percent of at least one blowing agent. The blowing agent can be introduced into the copolymer material during its polymerization or it can be added subsequently to a melt of virgin copolymer material.

Vinylaromatic monomers which are employed in forming the expandable vinylaromatic-acrylonitrile copolymers of the present invention have the formula $CH_2=CX-Ar$, wherein Ar is an aromatic radical, including various alkyl and halo-ring-substituted aromatic units having from 6 to 10 carbon atoms and X is hydrogen or an alkyl group having from 1 to 4 carbon atoms. Representative vinylaromatic monomers include styrene, o-methylstyrene, m-methylstyrene, p-methylstyrene, ethylstyrene, dimethylstyrene, alpha-methylstyrene, p-methoxystyrene, p-chlorostyrene, 2,4-dichlorstyrene, 2,5-dichlorostyrene, p-bromostyrene, alpha-methyl-p-methylstyrene, p-isopropylstyrene, vinyl naphthalene, acetanaphthalene, vinyl anthracene, indene, p-cyanostyrene and the like. Mixtures of the vinylaromatic monomers can be employed and it is currently preferred that the copolymer contain at least 50 weight percent styrene.

The copolymers can be prepared by any of the known processes typically employed for the free radical polymerization of vinylaromatic monomers, including mass, solution, suspension, emulsion, or combinations thereof to obtain particles in the form of beads or pellets. Such polymer particles typically have average particle diameter sizes in the range from 0.2 to 6 mm. A method for obtaining expandable thermoplastic polymer particles containing a volatile fluid forming agent is described in Morehouse, Jr. et al U.S. Pat. No. 3,615,972, which discloses the preparation of expandable microspheres by suspension-type polymerization of droplets of a mixture of monomer and blowing agent.

The blowing agents which are employed in the present invention preferably include aliphatic hydrocarbons such as propane, butane, isobutane, pentane, neopentane, isopentane and hexane; aliphatic cyclic hydrocarbons such as cyclobutane, cyclopentane and cyclohexane; and halogenated hydrocarbons such as methyl chloride, methylene chloride, dichlorofluoromethane, chlorotrifluoromethane, dichlorodifluoromethane, chlordifluoromethane and trichlorofluoromethane. Particularly preferred are those halogenated hydrocarbons which are not fully halogenated. The blowing agents are impregnated into the polymer particles in an amount of from 1 to 25 percent, preferably 5 to 20 percent, by weight of the acrylonitrile-based polymer particles. Currently, it is preferred to employ halogenated hydrocarbons as sole blowing agents with trichlorofluoromethane currently the preferred blowing agent.

The expansion aid which is employed in the practice of the invention consists essentially of triethylene glycol. Triethylene glycol is a well known article of commerce which is derived from ethylene and oxygen as a by-product of ethylene glycol manufacture. It is typically used as a solvent and plasticizer in vinyl, polyester and polyurethene resins; the dehydration of natural gas, as a humectant in printing inks; and as an extraction solvent. The use of triethylene glycol as an expansion aid in the virgin expandable polymer compositions of this invention unexpectedly permits the formulator to reduce the amount of blowing agent required to expand the compositions to a desired density. For example, in a specific case, the use of 0.5 weight percent triethylene glycol expansion aid permits a reduction in the amount of blowing agent of about 10%. The combination of the triethylene glycol expansion aid and the reduced amount of blowing agent results in the equivalent or enhanced expansion of the polymer composition in a shorter time in comparison to the expansion of the composition at the original unreduced level of blowing agent.

The exact mechanism by which the triethylene glycol expansion aid functions in the composition of the invention is not fully understood at this time. It is possible that the triethylene glycol may provide a plasticizing effect which could aid in lowering the glass transition temperature of the polymeric composition to make it more readily expandable, particularly in a steam environment. It is also possible that the triethylene glycol is fugitive and can diffuse out of the cellular structure or that it becomes microdispersed in the polymer composition.

In any event, the use of triethylene glycol as an expansion aid at the levels at which it is employed in the present composition does not negatively affect final product properties. The use of plasticizers, such as triethylene glycol, at conventional plasticizing levels which are well known in the art typically will result in a plasticizing effect on the composition which results in a permanent softening of the final cellular structure and an inability to expand the composition to vary those densities. Thus, in the general case, plasticizers are not normally included in polymeric compositions where it is desired to produce very low density foamed material. The triethylene glycol as an expansion aid is employed in the compositions of the invention in an amount in the range from about 0.2 to about 1.0%, preferably from about 0.4 to about 0.7, with 0.5 weight percent being particularly preferred, based on total weight of vinylaromatic monomer-acrylonitrile copolymer.

The triethylene glycol expansion aid is readily blended with vinylaromatic-acrylonitrile copolymer compositions. Preferably the triethylene glycol expansion aid is fed directly into the extruder and melt processed with the copolymer.

The expandable compostions of the present invention may be used to produce very low density material by means of either on-line or off-line expansion techniques. A very low density material may be produced by incorporating the blowing agent and the expansion aid into a vinylaromatic monomer-acrylonitrile copolymer composition having a glass transition temperature between about 60 degrees to about 100 degrees C. The expandable copolymeric composition containing the blowing agent is activated by heating causing the composition to expand. Typically, the expansion produces foam beads having a density of about 0.5-3 pounds per cubic foot (PCF). After aging, preferably for a period of from about 1 to about 7 days, the foam beads are exposed to steam at substantially atmospheric pressure for a period of from several seconds to two hours, and preferably about 5 to about 15 minutes. Both single and multiple steam expansions are contemplated. This causes further expansion of the beads to very low densities, e.g., as low as 0.2 PCF. The very low density foamed extrudate may then be molded in accordance with known techniques, or used directly in applications such as filling for packaging.

An alternative method in accordance with the present invention contemplates producing low density extruded foam by exposing the foam to steam after the foam leaves the extruder. This exposure to steam may take place after the extruded foam has been aged for a period of time or may take place immediately after the foam has left the die of an extruder.

The very low density foam products produced from the compositions of the invention have several benefits including low final product cost because of the very low density product which is produced and increased flexibility of the foam structure being caused by the thinness of the cell walls. The foams so produced find use as insulation and cushion packaging.

The specific working example which follows is intended to illustrate the invention but is not to be taken as limiting the scope thereof. In the example, parts and percentages are by weight unless otherwise specified or required by the context.

EXAMPLE 1

Expandable styrene-acrylonitrile, hereinafter referred to as SAN, blends are formulated as follows:

| Formulation | 1 | 2 | 3 |
|---|---|---|---|
| SAN | 81 | 82.5 | 83 |
| Blowing Agent$_a$ | 19 | 17 | 17 |
| Triethylene Glycol | 0 | 0.5 | 0 | a = trichlorofluoromethane

Formulations 1, 2 and 3 were individually melt blended in a screw-type extruder having zones for mixing and cooling at the end of usual sequential zones for feeding, melting and metering. An opening for blowing agent injection and extrusion aid injection was provided on the extruder barrel between the metering and mixing zones. At the end of the cooling zone there was attached a die orifice having an opening of "s" shape.

The granular styrene-acrylonitrile copolymer having a weight average molecular weight of about 150,000 and a glass transition temperature of less than 100 degrees C. was fed into the extruder at an essentially uniform rate of about 10 pounds per hour. The trichlorofluoromethane blowing agent was injected into the extruder at a predetermined rate, as was the triethylene glycol extrusion aid. The extruder zones were maintained at 170 degrees, 190 degrees, and 200 degrees C. for melting, metering and mixing zone, respectively, with the temperature of the cooling zone being adjusted so that the gel could be cooled down to a uniform temperature for optimum die expansion. The foamable composition was extruded through the "s" shaped die and cut into individual "s" shaped segments. The segments were aged. They were annealed in hot water (60 degrees C. for 45 minutes). The samples were then expanded in an atmospheric steam environment and allowed to age for 24 hours prior to a second steam expansion.

Figure 2:
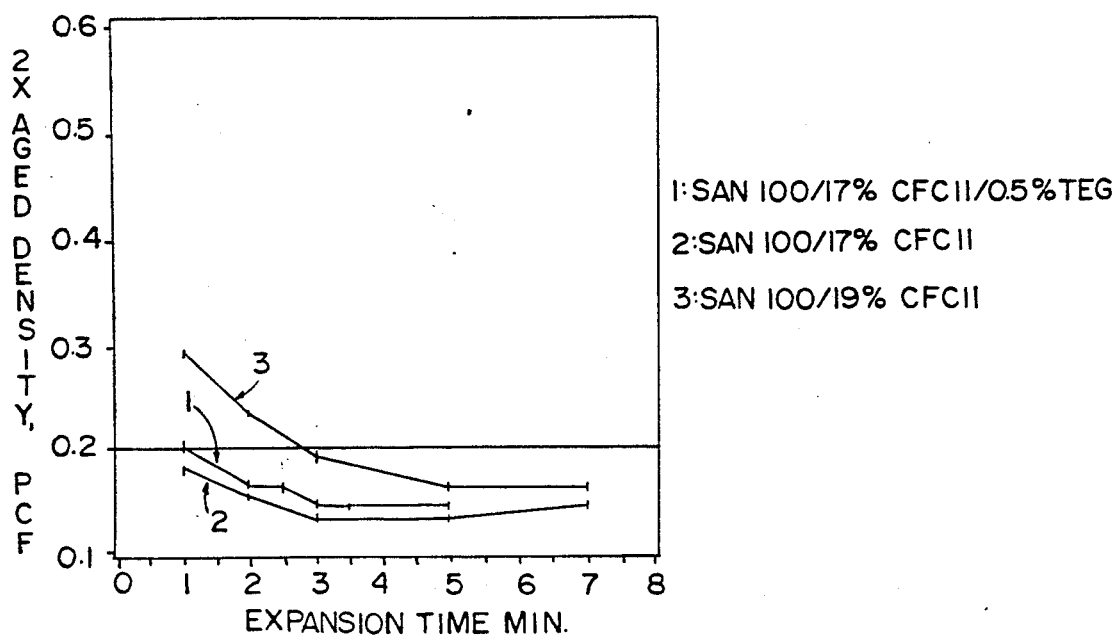
FIG. 2 is a graph demonstrating the effect of the triethylene glycol on steam expansion of expandable styrene-acrylonitrile copolymer beads after two passes through the steam chamber.

The remarkable effect of the triethylene glycol extrusion aid on steam expandability of expandable vinylaromatic monomer-acrylonitrile foam is demonstrated in the graphs of FIG. 1 and FIG. 2. As can be seen from the graphical presentation, formulation 2, representing the invention, demonstrates that the invention composition containing triethylene glycol expansion aid have an expansion behavior at least equivalent to the expansion behavior of a normal expandable composition containing approximately 10% more blowing agent. At the same time, the data also show that, when the same level of blowing agent as employed in the invention composition, i.e., 17% blowing agent, a higher final density is obtained. Thus, the data demonstrate that the use of triethylene glycol as an expansion aid in expandable vinylaromatic monomer-acrylonitrile copolymer composition unexpectedly reduces the amount of blowing agent needed to reach a desired density level.

Having described the invention in detail and by reference to the preferred embodiment thereof, it will be apparent that modification and variations are possible without departing from the scope of the invention defined in the appended claims.

What is claimed is:

1. A process for the preparation of an expanded polymeric foam composition comprising:

melt processing under pressure and at an elevated temperature a mixture comprising at least one vinylaromatic monomer-acrylonitrile copolymer, at least one blowing agent and from about 0.2 to about 1.0 percent by weight triethylene glycol;

extruding said mixture through a die to a zone of lower pressure and activating said blowing agent to expand said vinylaromatic monomer-acrylonitrile copolymer to a cellular structure; and exposing said cellular structure to steam or hot air at a temperature between about 80 degrees C. to about 115 degrees C. to expand the said cellular structure to a foam having a lower density.

2. A process according to claim 1 wherein the amount of said blowing agent is in the range from about 1 to about 25 percent by weight.

3. A process according to claim 1 wherein the amount of said triethylene glycol is in the range from about 0.4 to about 0.7 percent by weight.

4. A process according to claim 1 wherein said vinylaromatic monomer-acrylonitrile copolymer comprises styrene-acrylonitrile copolyer.

5. A process according to claim 4 wherein the amount of said blowing agent is in the range from about 1 to about 25 percent by weight, based on the weight of said styrene-acrylonitrile copolymer.

6. A process according to claim 5 wherein the amount of said triethylene glycol is in the range from about 0.4 to about 7 percent by weight.

7. A process according to claim 6 wherein the amount of said blowing agent is in the rang from about 5 to about 20 percent by weight.

8. A process according to claim 7 wherein the amount of said triethylene glycol is about 0.5 percent by weight.

* * * * *

UNITED STATES PATENT AND TRADEMARK OFFICE
CERTIFICATE OF CORRECTION

PATENT NO. : 5,071,606
DATED : Dec. 10, 1991
INVENTOR(S) : Martin H. Tusim, Timothy W. Rhoads It is certified that error appears in the above-identified patent and that said Letters Patent is hereby corrected as shown below:

Column 6, line 36, "7" should correctly appear as --0.7--.
Column 6, line 38, "rang" should correctly appear as --range--.

Signed and Sealed this

Seventeenth Day of August, 1993

Attest:

BRUCE LEHMAN

Attesting Officer      Commissioner of Patents and Trademarks